United States Patent

Couvignou et al.

(10) Patent No.: US 6,635,304 B2
(45) Date of Patent: Oct. 21, 2003

(54) BINDING BASE FOR A CULINARY PREPARATION AND METHOD OF PREPARING SAID BASE

(75) Inventors: Xavier Couvignou, Roquefort la Bedoule (FR); Olivier Houot, Strasbourg (FR); Inka Beck, Heibronn (DE); Rainer Weisbecker, Bad orb (DE)

(73) Assignee: Bestfoods, Englewood Cliffs, NJ (US)

( * ) Notice: Subject to any disclaimer, the term of this patent is extended or adjusted under 35 U.S.C. 154(b) by 261 days.

(21) Appl. No.: 09/829,586

(22) Filed: Apr. 10, 2001

(65) Prior Publication Data

US 2002/0006463 A1 Jan. 17, 2002

(30) Foreign Application Priority Data

Apr. 18, 2000 (FR) .............................. 00 04974

(51) Int. Cl.⁷ .............................. A23L 1/40; A23L 1/05
(52) U.S. Cl. .................... 426/589; 426/524; 426/613; 426/658
(58) Field of Search ................................ 426/589, 613, 426/658, 524

(56) References Cited

U.S. PATENT DOCUMENTS

| 3,966,993 A | * | 6/1976 | Luck | 426/589 |
| 4,363,824 A | * | 12/1982 | Willi et al. | 426/589 |
| 4,844,938 A | * | 7/1989 | Amamoto et al. | 426/589 |
| 5,145,705 A | * | 9/1992 | Seeds | 426/589 |
| 5,897,896 A | * | 4/1999 | Thomas | 426/94 |

FOREIGN PATENT DOCUMENTS

| EP | 0029 153 | | 5/1981 |
| GB | 874182 | | 8/1961 |
| JP | 10337 166 | | 12/1998 |
| JP | 11235 156 | | 8/1999 |
| WO | WO 98/47386 | * | 10/1998 |

OTHER PUBLICATIONS

FA 585 130 France Search Report for FR 0004974 dated Jan. 25, 2001.

* cited by examiner

*Primary Examiner*—Nina Bhat

(57) ABSTRACT

A base or roux which can serve as a binder for sauces comprises between 40% and 10% by weight of starch, between 10% and 40% by weight of flour and 50% by weight of fat, of which 5% to 10% by weight of stearin playing the role of thickening agent to give the base a viscous and stable texture. To prepare the base, a principal fat and flour are mixed, the mixture is heated and a liquid phase is obtained, and then the liquid mixture is cooled. Before cooling the mixture, a thickening agent is added thereto in order to obtain a viscous phase after cooling, and the mixture is stirred while it is being cooled in order to maintain the solid particles in suspension in the viscous phase after cooling.

10 Claims, 1 Drawing Sheet

BINDING BASE FOR A CULINARY PREPARATION AND METHOD OF PREPARING SAID BASE

BACKGROUND OF THE INVENTION

1. Field of the Invention

The invention relates to a binding base, or "roux", which serves in particular as binder for various sauces.

2. The Related Art

In a non-industrial manner, roux is prepared with fat, generally butter, in which flour is browned, to a greater or lesser degree depending on whether white roux or brown roux is desired. To prepare a sauce, for example a béchamel sauce, milk is added to the roux and the mixture is heated while mixing it. Since roux has a pasty texture, its mixing with the milk is difficult, with the risk of lumps being formed.

To facilitate the preparation of sauces, it is possible to use neutral or flavoured, ready-to-use roux in the form of granules which is commercially available. To prepare a sauce, the roux in the form of granules is dissolved in a liquid (water, milk and the like), while heating the mixture. However, the use of roux in the form of granules can prove difficult. Indeed, there are instances when the roux dissolves poorly and also causes the formation of lumps.

SUMMARY OF THE INVENTION

The present invention proposes to further facilitate the preparation of sauces based on roux.

To this effect, the invention relates to a binding base for a culinary preparation, comprising fat and flour, characterized in that it also comprises a thickening agent to give the base a viscous and stable texture.

The melting point of the thickening agent, preferably stearin, is higher than that of the fat. Thus, by virtue of the addition of this agent, the fat is sufficiently viscous at room temperature in the finished product and prevents sedimentation, that is to say the formation of two separate liquid and solid phases. At room temperature, the binding base is both liquid, with a certain viscosity, and stable, the solid particles of flour and starch, when present, being maintained in suspension in the viscous phase (fat and stearin).

Preferably, starch is also provided and the proportion by weight of flour and starch is substantially equal to 50%.

Still preferably, there are provided between 40% and 10% by weight of starch, between 10% and 40% by weight of flour, and 50% by weight of fat, of which 5% to 10% by weight of stearin.

The invention also relates to a method of preparing the above binding base, in which a principal fat and flour are mixed, the mixture is heated and a liquid phase is obtained, and then the liquid mixture is cooled, characterized in that before cooling the mixture, a thickening agent is added thereto in order to obtain a viscous phase after cooling, the mixture is stirred while it is being cooled so as to maintain the solid particles in suspension in the viscous phase after cooling.

When a fat cools, it crystallizes. The crystallization is oriented by stirring, and optionally by shearing, the mixture during its cooling. The stirring (and the shearing) of the mixture during its cooling, on the one hand, and the use of the thickening agent, on the other hand, are two factors which contribute to maintaining the solid particles in suspension in a viscous phase, at room temperature, in the finished product. By this means, a liquid binding base is obtained which has a certain viscosity at room temperature and which does not sediment by separation of the solid particles from the viscous phase and deposition of these particles at the bottom of the packaging in which the binding base is packaged.

Advantageously, the mixture is cooled by heat exchange with a cooling liquid.

Preferably, there are mixed between 40% and 10% by weight of starch, between 10% and 40% by weight of flour, and 50% by weight of fat, of which 5% to 10% by weight of stearin.

In a particular embodiment, the mixture is heated to about 130° C.

By heating the mixture at this temperature, the raw flour taste is avoided, the moisture is removed from the flour and the enzymes in the flour, which are capable of breaking up subsequent binding in the finished product, are destroyed.

In another embodiment, the flour is cooked before being added to the other ingredients.

The preliminary cooking of the flour also makes it possible to avoid the raw flour taste, to remove the moisture from the flour and to destroy the enzymes in the flour. However, in this case, it is not necessary to heat the mixture to 130° C.

BRIEF DESCRIPTION OF THE DRAWINGS

The invention will be understood more clearly with the aid of the following description of a particular embodiment of the binding base and of the method of preparing this base, with reference to the appended drawing in which.

DETAILED DESCRIPTION OF THE INVENTION

Figure 1:
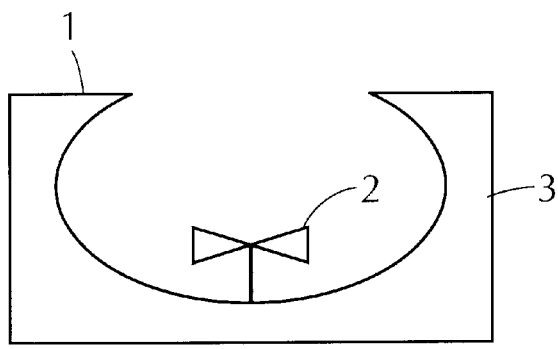
FIG. 1 represents a diagram of the container used to prepare the binding base in the method of FIG. 1.
Figure 2:
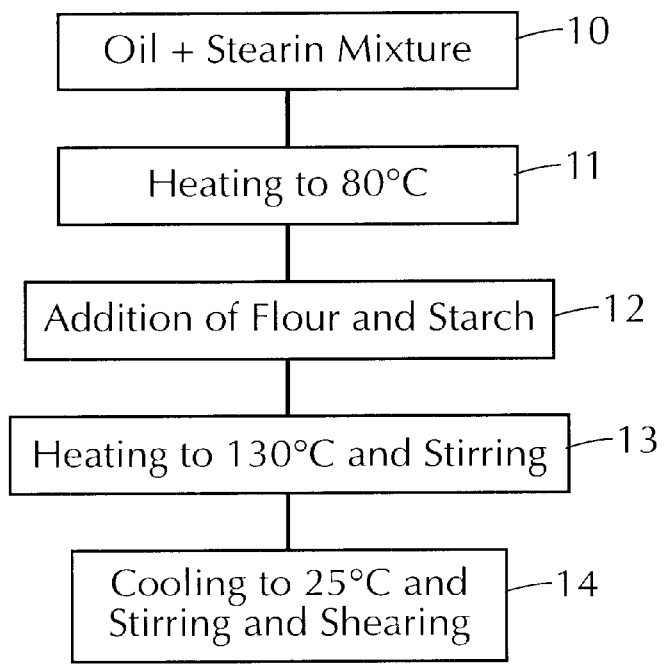
FIG. 2 represents a flow chart of the various stages of the method of preparation of the invention, according to a particular embodiment.

The binding base of the invention serves as binder for various preparations, in particular for sauces, for example a béchamel.

In the particular example of the description, the binding base comprises flour, starch, a principal fat, in this case sunflower oil, and a thickening agent, in this instance stearin. The stearin is an additional fat whose melting point is higher than that of the principal fat. Because of this, the stearin makes the oil sufficiently viscous and contributes to giving the base a viscous and stable texture at room temperature. The term "stable" is understood to mean that there is no sedimentation, that is to say separation of the solid particles of flour and starch from the liquid phase, comprising oil doped with stearin, and deposition of these particles at the bottom of the packaging containing the base. The solid particles remain in suspension in the viscous phase.

The proportions by weight of the various ingredients entering into the composition of the base are the following:

between 40% and 10% of starch, between 10% and 40% of flour,

50% by weight of fat, of which 5% to 10% by weight of stearin, the sum of the various proportions having to be equal to 100%.

It will be emphasized that the proportions by weight of flour and starch, on the one hand, and of fat (oil and stearin) on the other hand, are substantially equal to 50%.

Various tests, which consisted in varying the relative proportions of the various ingredients of the base, showed the following results.

If 45% by weight of solid ingredients (flour and starch) is taken, sedimentation is observed after 24 hours approximately. The base is not therefore stable. On the other hand, if more than 50% by weight of solid ingredients (flour and starch) is taken, the texture of the base becomes pasty.

If the proportion by weight of stearin is less than 5%, a more or less rapid sedimentation of the base is also observed. If it is greater than 5%, the base is too pasty, or even solid.

The method of preparing the base will now be described.

A mixer is taken which comprises a container 1 and, inside the container 1, a mixing and shearing member 2.

The container 1 comprises a jacketed hollow wall 3, with an inlet orifice and an outlet orifice, both connected to a first external pump for circulating a heating fluid, in this case steam, and to a second external pump for circulating a cooling fluid, in this case glycol-containing cold water at about −5° C. The two pumps, not represented, are intended to circulate, inside the wall 3 of the container 1, either steam, or glycol-containing cold water, depending on whether it is desired to heat or cool the contents of the container. A system of valves makes it possible to regulate the circulation of the fluids inside the wall 3. Thus, the heating, or the cooling, of the contents of the container 1 is carried out by heat exchange with the heating fluid, or with the cooling fluid, which is circulated inside the wall 3 of the container 1 with the aid of the appropriate pump.

The mixing member 2 is a mixing blade having the shape of a two-paddle propeller. It is placed at the bottom of the container 1 and mounted so that it rotates on the shaft of a propelling motor, not represented.

To prepare the base, edible sunflower oil is poured into the container 1 and stearin is added thereto (stage 10). The mixture of oil and stearin is then heated to about 80° C., by heat exchange with steam which is circulated inside the wall 3 (stage 11). The oil is thus made more fluid and consequently easier to work. Flour and starch, in the form of powders, are then added to the mixture of oil and stearin (stage 12). From the outset, it will be noted that the respective proportions of the various ingredients mixed (oil, stearin, flour and starch) are in accordance with the proportions indicated above.

The mixture of oil, stearin, flour and starch is then stirred, by driving the mixing blade 2 in rotation, and concomitantly, the mixture is heated for a period, in this case, of about 25 minutes and to a temperature substantially equal to 130° C. by heat exchange with steam which is circulated inside the wall 3 (stage 13). The heating makes it possible to avoid the raw flour taste, to remove moisture from the flour and to destroy the enzymes in the flour which are capable of attacking the starch and of destroying the subsequent binding of the finished product. On heating, the oil, doped with stearin, forms a liquid phase in which the solid particles of flour and starch are suspended as a result of the stirring.

The heating is then stopped and the mixture is cooled, by heat exchange with glycol-containing cold water at about −5° C. which is circulated inside the wall 3 of the container 1, to about 25° C. (stage 14). During the cooling of the mixture it is vigorously stirred and sheared by driving the mixing blade 2 at a speed of about 3000 revolutions per minute, for a period substantially of between 30 and 45 minutes.

The stirring and the shearing of the mixture, while it is being cooled, make it possible to orient the crystallization of the oil and, by this means, to maintain the solid particles of flour and starch in suspension in the liquid phase of the binding base. In addition, the addition of stearin, before the cooling of the mixture, makes it possible to obtain a viscous phase in the finished product after cooling. Thus, by virtue of the combined action of the stearin, on the one hand, and of the stirring and the shearing of the mixture during its cooling, on the other hand, a binding base is obtained which is viscous and stable at room temperature, the solid particles remaining in suspension in a viscous phase.

After cooling, the roux is packaged in packagings.

While adding the flour and the starch, it would be possible to add to the mixture spices, powdered cream or other ingredients for flavouring.

In the preceding description, the flour used to prepare the binding base is ordinary. As a variant, the flour is cooked before adding it to the other ingredients. In this case, the mixture of oil, stearin, precooked flour or "toasted" flour according to the vocabulary used by persons skilled in the art, and starch is heated to a temperature of less than 130° C. It is also possible to heat and then cool the oil and the stearin before adding the precooked flour thereto. Any other fat could be used in place of the oil.

What is claimed is:

1. A binding base composition for a culinary preparation, comprising fat and flour and further comprising a thickening agent to give the base a viscous and stable texture wherein the thickening agent is stearin.

2. The composition of claim 1 further comprising starch wherein the proportion by weight of flour and starch is substantially equal to 50%.

3. The composition of claim 2 comprising between 40% and 10% by weight of starch, between 10% and 40% by weight of flour, and 50% by weight of fat, of which 5% to 10% by weight is stearin.

4. A method of preparing the binding base of claim 1 comprising mixing a principal fat and thickening agent, heating the mixture to obtain a liquid phase, adding flour and then cooling the liquid mixture while stirring so as to maintain the solid particles in suspension in a viscous phase obtained after cooling wherein the thickening agent is stearin.

5. The method of claim 4, in which the mixture is cooled by heat exchange with a cooling liquid.

6. The method of claim 4 in which there are mixed between 40% and 10% by weight of starch, between 10% and 40% by weight of flour, and 50% by weight of fat, of which 5% to 10% by weight is stearin.

7. The method of claim 4 in which the mixture is heated to about 130° C.

8. The method of claim 4 in which the flour is cooked before being added to the other ingredients.

9. The method of claim 4 in which the fat is heated before adding the flour thereto.

10. The method of claim 9 in which the fat is heated and then cooled before adding precooked flour thereto.

* * * * *